(12) United States Patent
Nakamura et al.

(10) Patent No.: US 7,866,450 B2
(45) Date of Patent: Jan. 11, 2011

(54) BRAKE DEVICE

(75) Inventors: Koshi Nakamura, Saitama (JP); Makoto Toda, Saitama (JP); Tetsuyoshi Kikuchi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 18 days.

(21) Appl. No.: 11/892,877

(22) Filed: Aug. 28, 2007

(65) Prior Publication Data

US 2008/0053762 A1 Mar. 6, 2008

(30) Foreign Application Priority Data

Aug. 31, 2006 (JP) .............................. 2006-236957

(51) Int. Cl.
*F16D 65/00* (2006.01)
(52) U.S. Cl. ................................. 188/218 A
(58) Field of Classification Search ............... 188/18 A, 188/205 R, 206 R, 218 A, 218 R
See application file for complete search history.

(56) References Cited

U.S. PATENT DOCUMENTS

| 4,005,768 | A | * | 2/1977 | Bubnash et al. ......... 188/218 A |
| 4,207,971 | A | * | 6/1980 | Ishikawa et al. ......... 188/218 A |
| 4,257,498 | A | * | 3/1981 | Nogami ................... 188/218 A |
| 4,295,549 | A | * | 10/1981 | Shibatani et al. ......... 188/218 A |
| 4,317,508 | A | * | 3/1982 | Katagiri et al. .......... 188/218 A |
| 5,735,370 | A | * | 4/1998 | Nitta et al. .............. 188/218 A |
| 6,047,796 | A | * | 4/2000 | Fitzgerald ............... 188/218 A |
| 6,318,809 | B1 | * | 11/2001 | Bennett .................. 301/37.101 |
| 7,451,857 | B2 | * | 11/2008 | Hasegawa et al. ......... 188/18 A |
| 2006/0011424 | A1 | * | 1/2006 | Goodell et al. .......... 188/218 A |

FOREIGN PATENT DOCUMENTS

JP 2006-71042 A 3/2006

* cited by examiner

*Primary Examiner*—Christopher P Schwartz
(74) *Attorney, Agent, or Firm*—Birch, Stewart, Kolasch & Birch, LLP

(57) ABSTRACT

A brake disc guard is provided inside of a rim of a front wheel and mounted on a knuckle. A caliper is located in a cutout portion formed at a front portion of the brake disc guard. The caliper is supported through a caliper bracket to the knuckle. A large-diameter portion is formed at an upper front end portion of the brake disc guard. The large-diameter portion extends so as to cover the upper side of the caliper bracket and the caliper. A scraper is formed at the front end of the large-diameter portion so as to be bent radially outwardly. The spacing a between the rim and the scraper is set to be the smallest. The dirt deposited on the rim is scraped off by the scraper, so that the dirt separated from the rim is prevented from falling onto the caliper.

20 Claims, 10 Drawing Sheets

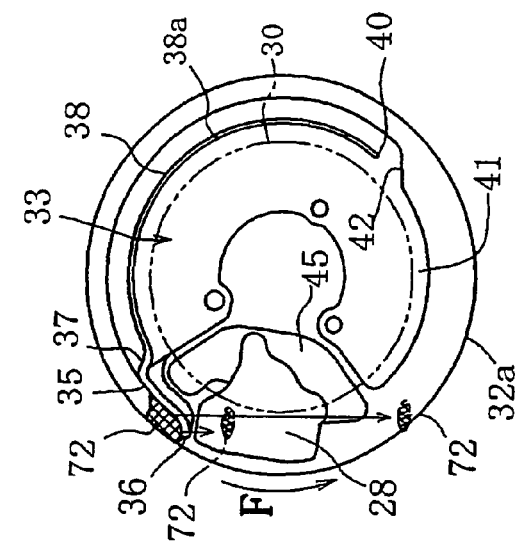
FIG. 11A1
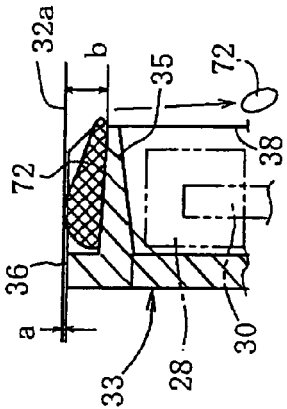
FIG. 11A2
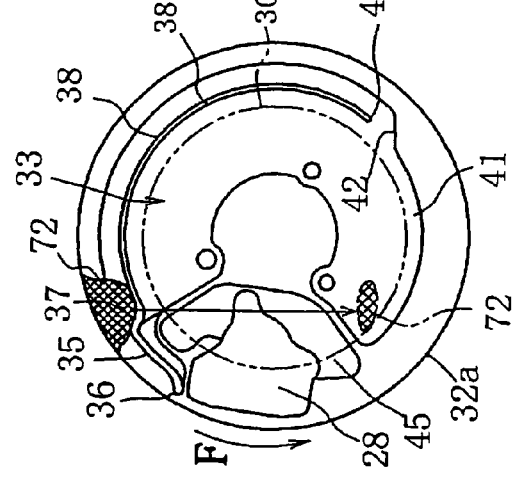
FIG. 11B1
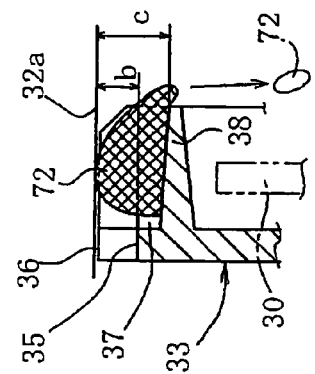
FIG. 11B2
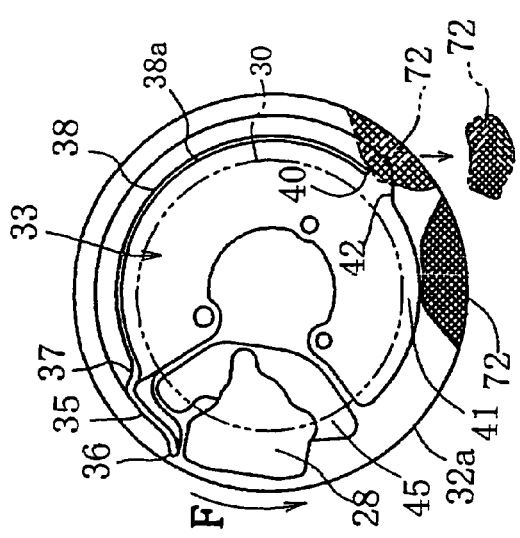
FIG. 11C1
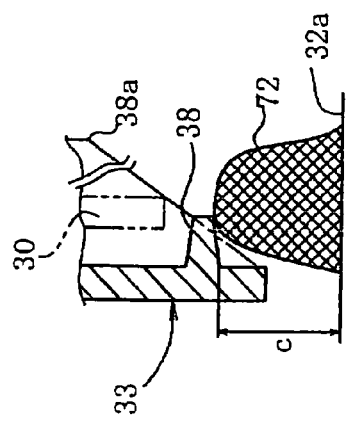
FIG. 11C2

BRAKE DEVICE

CROSS-REFERENCE TO RELATED APPLICATIONS

The present application claims priority under 35 USC 119 to Japanese Patent Application No. 2006-236957 filed on Aug. 31, 2006 the entire contents of which are hereby incorporated by reference.

BACKGROUND OF THE INVENTION

1. Field of the Invention

The present invention relates to a brake device suitable for use in an off-road vehicle. More particularly to a brake device having a cover member for covering a brake disc.

2. Description of Background Art

An off-road vehicle having a wheel-in disc brake structure such that a disc brake is provided inside of a rim of a wheel is known wherein a brake disc guard for covering a disc of the disc brake is provided and wherein the side surface of the brake disc guard at an upper portion thereof is formed with a flange extending in a circumferential direction along the outer circumference of the disc and projecting sideward so as to cover the outer circumference of the disc. In such a structure having the brake disc guard, a space is formed between the flange and the rim wherein it is possible that dirt such as mud, snow, and grass may enter this space during operation of the vehicle on rough terrain. To eliminate this possibility, there has been proposed a structure such that a radial projection is formed at an end portion of a caliper bracket so as to come close to the rim. This radial projection functions to scrape off the dirt moving in the space between the rim and the flange during the rotation of the rim. See, for example, Japanese Patent Laid-open No. 2006-71042.

In the above conventional structure wherein the radial projection is formed at the end portion of the caliper bracket to remove the dirt from the space between the rim and the flange, there is a problem such that the caliper bracket formed of metal is increased in size because of the formation of the radial projection coming close to the rim, causing an increase in the weight of the caliper bracket. Further, high accuracy is required to ensure a proper clearance between the rim and the radial projection.

In addition, a caliper cannot be covered by the brake disc guard, so that dirt is prone to enter the caliper.

SUMMARY AND OBJECTS OF THE INVENTION

It is accordingly an object of an embodiment of the present invention to provide a brake device which can be reduced in weight, can easily ensure a proper clearance between the rim and the radial projection, and can prevent the entry of dirt into the caliper.

In accordance with an embodiment of the present invention, there is provided a brake device having a disc brake provided inside of a rim of a wheel and supported by a knuckle of a suspension and a cover member formed of resin for covering a disc of said disc brake. The cover member being provided inside of the rim and supported by the knuckle. In addition, the cover member includes a scraper projecting so as to come close to the rim.

In accordance with an embodiment of the present invention, the cover member has a flange extending in a circumferential direction along the outer circumference of the disc and projecting sideward so as to cover the outer circumference of the disc. The scraper is formed integrally with the flange.

In accordance with an embodiment of the present invention, the scraper and a part of the flange extend so as to cover the upper side of a caliper and a part of a caliper bracket.

According to an embodiment of the present invention, the cover member formed of resin for covering the disc has the scraper projecting so as to come close to the rim. Accordingly, a radial projection as a scraper is not formed on a metal member as a caliper bracket, thereby preventing an increase in size of the caliper bracket and therefore realizing a weight reduction. Furthermore, since the cover member is formed of resin, a proper clearance can be ensured between the rim and the scraper without the need for high accuracy.

According to an embodiment of the present invention, the cover member has the flange projecting sideward so as to cover the outer circumference of the disc, and the scraper is formed integrally with the flange. Accordingly, the entry of dirt into the space between the rim and the flange can be suppressed. Even when dirt enters the space between the rim and the flange, the dirt can be positively scraped off by the scraper, thereby preventing the entry of dirt into the caliper.

According to an embodiment of the present invention, the scraper and a part of the flange extend so as to cover the upper side of the caliper and a part of the caliper bracket. Accordingly, the dirt present in the space between the rim and the flange can be prevented from reaching the caliper.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 11A1 to 11C1 are side views for illustrating the operation of the brake disc guard, and FIGS. 11A2 to 11C2 are sectional views of essential parts of the brake disc guard, showing the relation between the brake disc guard and the dirt deposited on a rim.

DETAILED DESCRIPTION OF THE PREFERRED EMBODIMENTS

A preferred embodiment of the present invention will now be described with reference to the drawings. In the description and drawings of the present invention, the terms of "front," "rear," "right," "left," "upper," and "lower" are used with respect to the vehicle. Further, these terms are used with respect to a mounted condition on the vehicle body.

Figure 1:
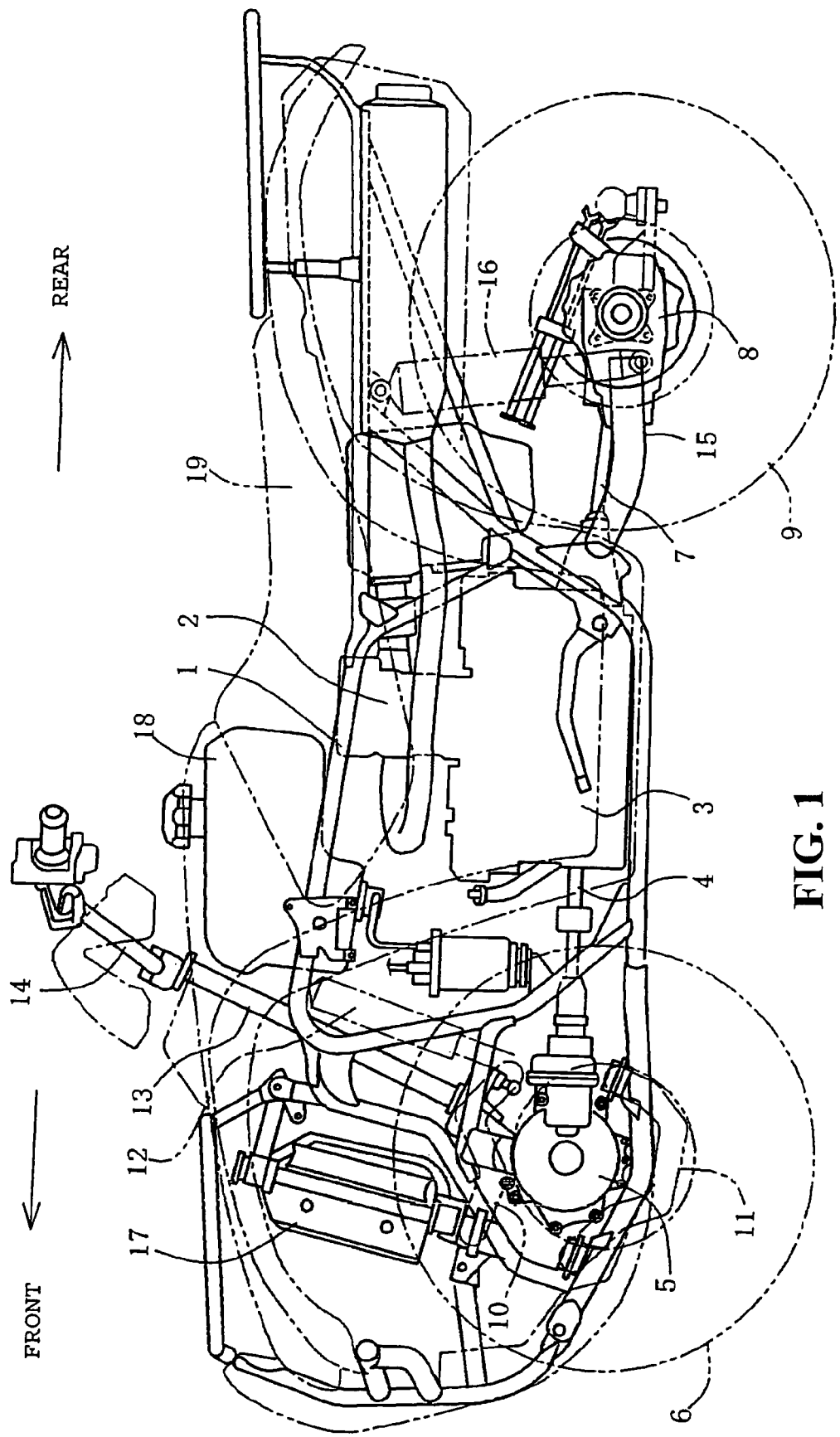
FIG. 1 is a side view of an off-road vehicle according to a preferred embodiment of the present invention.

FIG. 1 is a side view of an off-road vehicle according to a preferred embodiment of the present invention. This off-road vehicle is a saddle seat type four-wheel drive vehicle having low-pressure balloon tires. An engine 2 and a transmission 3 are mounted on a body frame 1 at a central portion thereof. A front drive shaft 4 extends to the front from the transmission 3 to transmit engine power through a front gear box 5 to right and left front wheels 6. Similarly, a rear drive shaft 7 extends to the rear from the transmission 3 to transmit engine power through a rear gear box 8 to right and left rear wheels 9.

Each front wheel 6 is supported by a double wishbone type front suspension including an upper arm 10, a lower arm 11, and a front shock absorber 12. The front wheels 6 are steered by a bar handle 14 through a steering shaft 13. Each rear wheel 9 is provided with a rear suspension having a rear arm 15 and a rear shock absorber 16. The vehicle further includes a radiator 17, a fuel tank 18, and a saddle seat 19.

Figure 2:
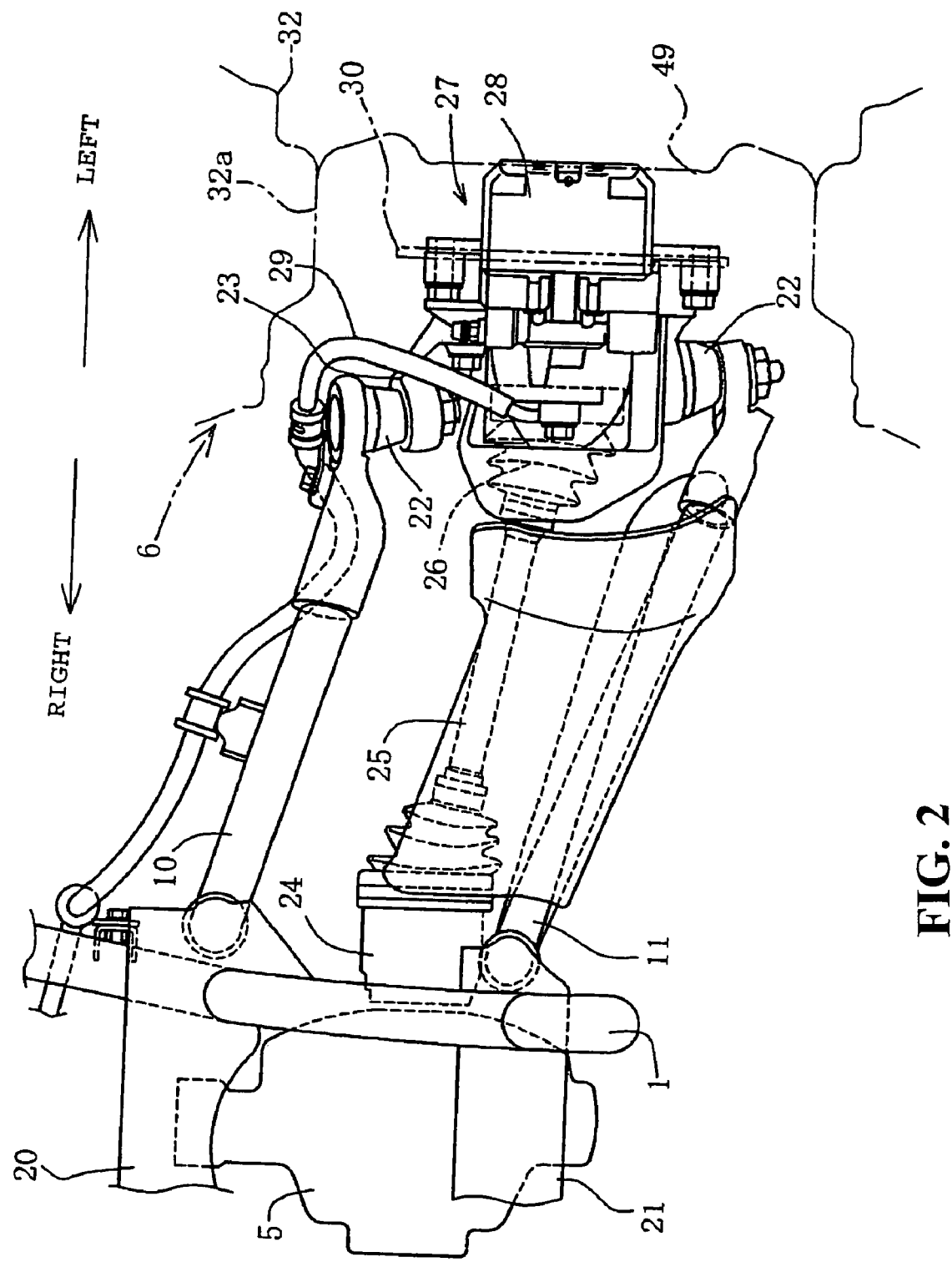
FIG. 2 is a front elevation of a left front suspension as viewed from the front side of the vehicle.

FIG. 2 is a front elevation of the left front suspension as viewed from the front side of the vehicle. Upper and lower cross members 20 and 21 that spaced from each other are supported to a front portion of the body frame 1. The front gear box 5 is supported to the upper and lower cross members 20 and 21. The right ends of the upper and lower arms 10 and 11 are pivotably supported to the left ends of the cross members 20 and 21, respectively. Although not shown, the structure of the right front suspension is similar to that shown in FIG. 2.

The left ends of the upper and lower arms 10 and 11 are connected through upper and lower ball joints 22 to a knuckle 23. A hub (to be hereinafter described) of the front wheel 6 is rotatably connected to the knuckle 23. The engine power transmitted to the front gear box 5 is further transmitted through a constant velocity joint 24, a front shaft 25, and a constant velocity joint 26 to the front wheel 6. The constant velocity joint 24 is provided at a side portion of the front gear box 5. The constant velocity joint 26 is provided at the hub of the front wheel 6.

A caliper 28 of a front wheel disc brake 27 is mounted on the knuckle 23. The caliper 28 is hydraulically driven through a brake hose 29 to apply a braking force to a disc 30 mounted on the hub. The brake hose 29 is clamped to the upper arm 10 and extends to the bar handle 14.

Figure 3:
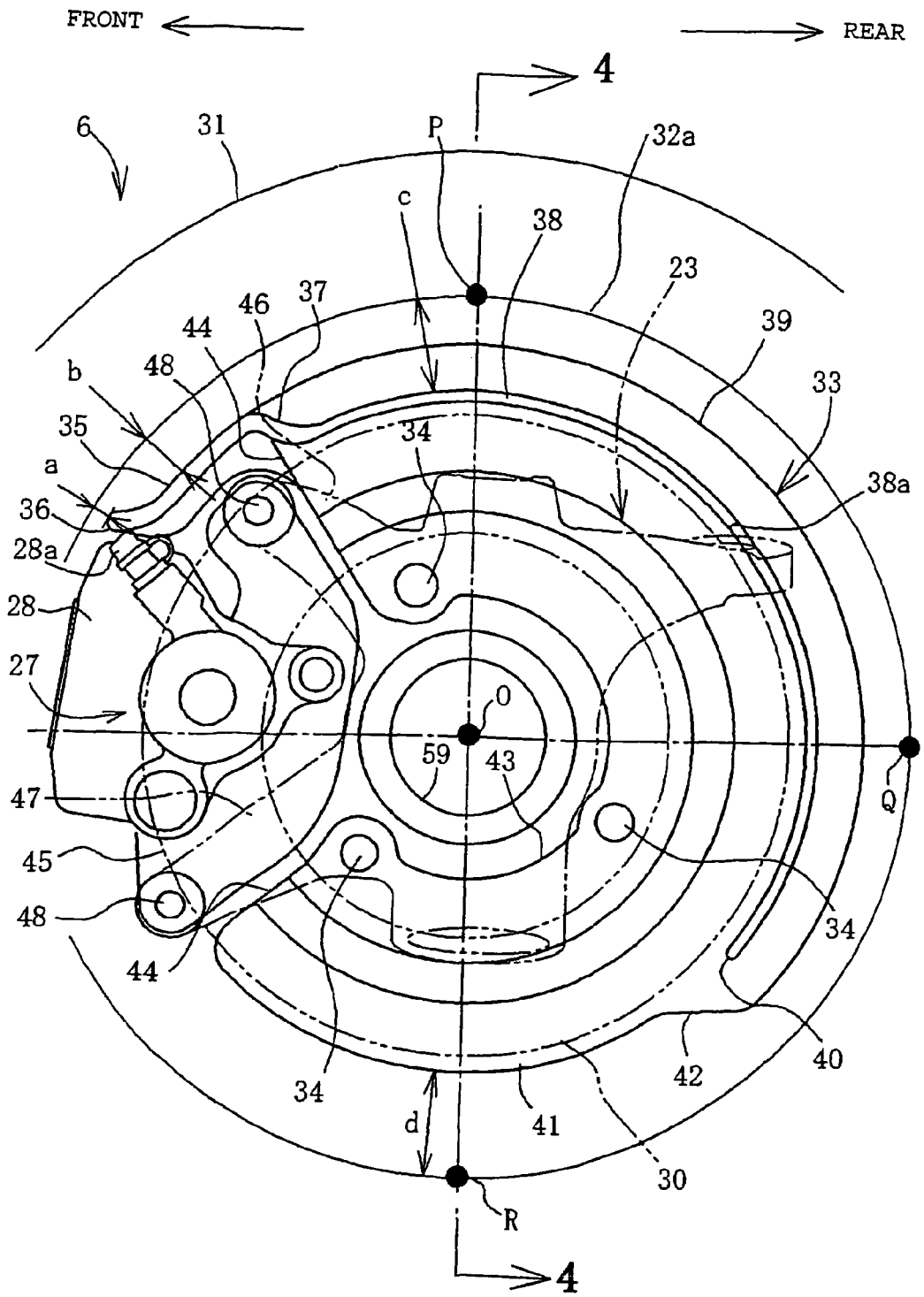
FIG. 3 is a side view of a left front wheel as viewed from the left side of the vehicle.

FIG. 3 is a side view of the disc brake 27 and a brake disc guard 33 in the front wheel 6 as viewed from the left side of the vehicle. The front wheel 6 has a tire 31 and a rim 32. In FIG. 3, the hub and a wheel disc (to be hereinafter described) provided inside of the rim 32 are not shown.

The brake disc guard 33 is provided inside of the rim 32 and fastened to the side surface of the knuckle 23 by means of three bolts 34. The brake disc guard 33 has such a shape that a front portion of an annular plate is sectorially cut out by about 90°, and the caliper 28 is exposed to this cutout portion.

An upper front end portion of the brake disc guard 33 is formed as a large-diameter portion 35 having an arcuate shape extending above the caliper 28. The front end of the large-diameter portion 35 is formed as a scraper 36 curved radially outward so as to come close to the rim 32. The scraper 36 is located just above a bleeder cap 28a of the caliper 28 as viewed in a side elevation. The scraper 36 and the large-diameter portion 35 are formed so as to cover the upper side of most of the caliper 28. The large-diameter portion 35 is integrally connected through a step portion 37 to a flange 38 having an arcuate shape smaller in diameter than the large-diameter portion 35. The large-diameter portion 35 including the scraper 36 has a wall thickness larger than that of the flange 38.

The rear end of the large-diameter portion 35 continues to the front end of the step portion 37, and the rear end of the step portion 37 continues to the front end of the flange 38. Thus, the flange 38 extends continuously through the step portion 37 to the large-diameter portion 35 including the scraper 36, and it can be said that the large-diameter portion 35 and the step portion 37 function as a part of the flange 38. The brake disc guard 33 has an upper portion 39 and a lower portion 41. The flange 38 is formed along an arcuate line extending radially inside of the outer circumference of the upper portion 39. More specifically, the flange 38 is formed concentrically with the outer circumference of the upper portion 39 so as to extend to a position near the lower portion 41. Accordingly, an outer circumferential portion of the upper portion 39 is formed as an arcuate side wall projecting radially outwardly from the flange 38. An inner circumferential portion of the upper portion 39 is formed radially inside of the flange 38. In addition, an outer circumferential portion of the disc 30, mounted concentrically with the front wheel 6, is closely opposed to the above inner circumferential portion of the upper portion 39.

O denotes the center of the front wheel 6, P denotes the intersection between the vertical line passing through the center O and the upper end of the inner circumference (smallest-diameter portion 32a) of the rim 32, R denotes the intersection between the vertical line passing through the center O and the lower end of the inner circumference of the rim 32, and Q denotes the intersection between the horizontal line passing through the center O and the rear end of the inner circumference of the rim 32. Thus, the angle formed between the line connecting the points O and P and the line connecting the point O and the front end of the step portion 37 is about 30°, the angle formed between the line connecting the point O and the rear end of the large-diameter portion 35 and the line connecting the point O and the front end of the large-diameter portion (the front end of the scraper 36) is about 30°, the angle formed between the line connecting the points O and P and the line connecting the points O and Q is 90°, the angle formed between the line connecting the points O and Q and the line connecting the point O and a lower end 40 of the flange 38 is about 30°, and the angle formed between the line connecting the point O and the lower end 40 of the flange 38 and the line connecting the points O and R is about 60°.

The outer circumference of the upper portion 39 of the brake disc guard 33 continues through a step portion 42 to the outer circumference of the lower portion 41 of the brake disc guard 33. The step portion 42 is formed in the vicinity of the lower end 40 of the flange 38, and the lower portion 41 is smaller in diameter than the upper portion 39 owing to the presence of the step portion 42. The outer circumference of the lower portion 41 substantially coincides with the extension of the inner circumference of the flange 38.

More specifically, letting a denote the spacing between the rim 32 and the scraper 36, b denote the spacing between the rim 32 and the large-diameter portion 35, c denote the spacing between the rim 32 and the flange 38, and d denote the spacing between the rim 32 and the outer circumference of the lower portion 41, the relation of a<b<c<d is established. Further, the spacing between the rim 32 and the outer circumference of the upper portion 39 is substantially equal to b.

The brake disc guard 33 is formed with a central arcuate cutout portion 43 and a front divergent cutout portion 44 diverging from the front opening of the central arcuate cutout portion 43. A caliper bracket 45 is located at the front divergent cutout portion 44 and mounted through bolts 48 to upper and lower arms 46 and 47 projecting to the front from a front portion of the knuckle 23. The caliper 28 is supported to the caliper bracket 45.

Figure 4:
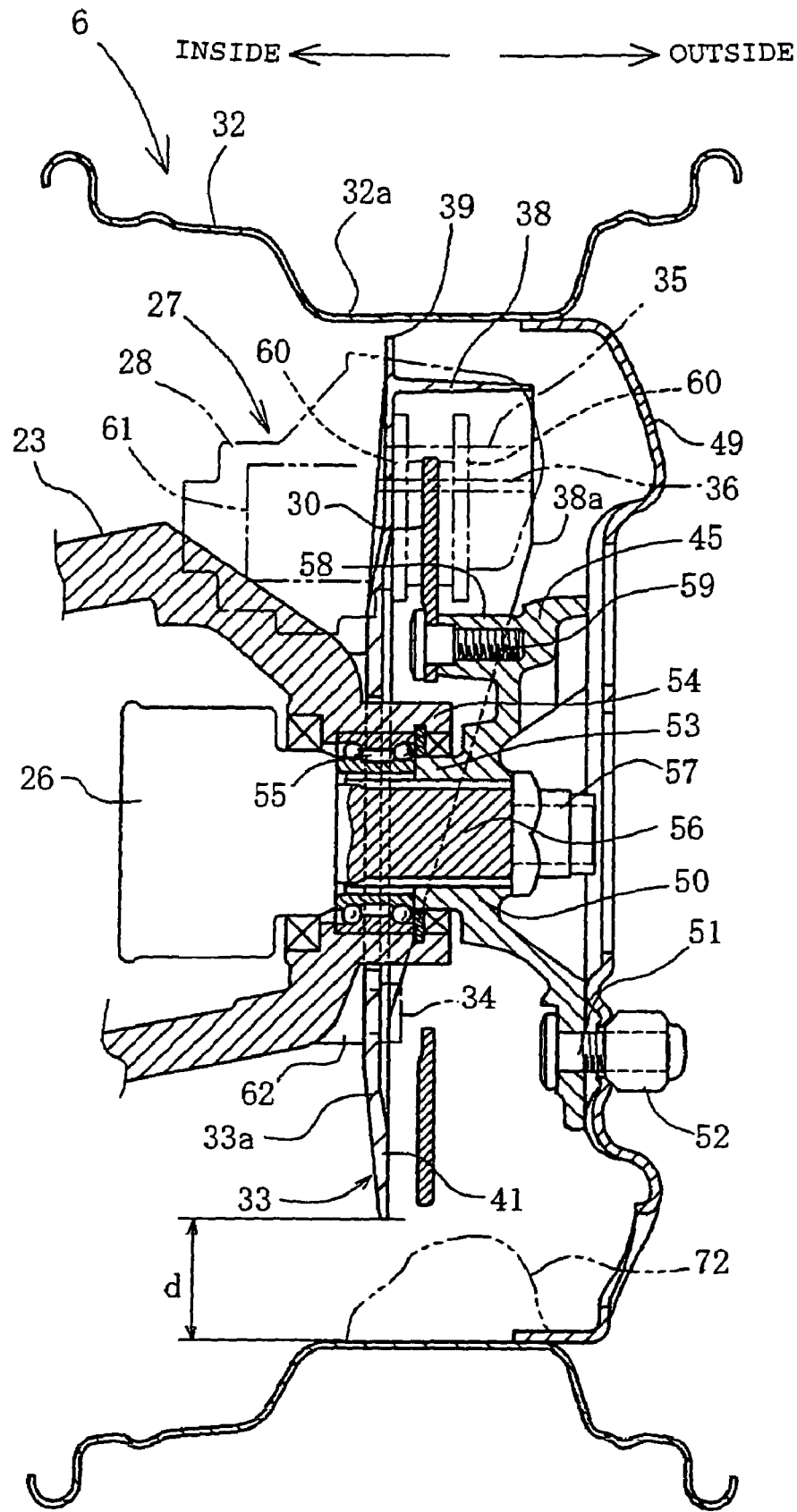
FIG. 4 is a cross section taken along the line 4-4 in FIG. 3.

FIG. 4 is a cross section taken along the line 4-4 in FIG. 3. The front wheel 6 is provided with a wheel disc 49 having an outer circumferential portion connected to the smallest-diameter portion 32a of the rim 32. A hub 50 is located axially inside of the wheel disc 49 in the lateral direction of the vehicle, and mounted to the wheel disc 49 by means of bolts 51 and nuts 52, thereby attaining rotation of the hub 50, the wheel disc 49, and the rim 32 as a unit.

A center boss 53 of the hub 50 is fitted in a center boss 54 of the knuckle 23 and supported by a bearing 55 to the center boss 54. Thus, the hub 50 is rotatably supported to the knuckle 23. A boss portion 56 of the constant velocity joint 26 is fitted in a central through hole of the center boss 53 and splined thereto. A nut 57 is tightened to the boss portion 56 to thereby integrate the hub 50 with the constant velocity joint 26.

The hub 50 is formed with a plurality of bosses 58 radially outside of the center boss 53, and an inner circumferential portion of the disc 30 is mounted to the bosses 58 of the hub 50 by means of bolts 59. A pair of pads 60 of the caliper 28 are arranged so as to face the opposite side surfaces of the disc 30 and are adapted to come into pressure contact with the disc 30. In FIG. 4, the caliper 28 is shown at an upper position different from an actual position for the convenience of illustration.

The knuckle 23 is formed with a plurality of bosses 62 at a shoulder portion around a central portion. A side wall portion 33a of the brake disc guard 33 is mounted to the bosses 62 of the knuckle 23 by means of the bolts 34. As viewed in the cross section shown in FIG. 4, the side wall portion 33a extends substantially straight in the vertical direction.

The scraper 36, the large-diameter portion 35, and the flange 38 integrally project outwardly from the side wall portion 33a in parallel to the axis of rotation of the front wheel 6 so as to cover the upper side of the disc 30. Although the caliper 28 is shown so as to be located above the scraper 36 and the large-diameter portion 35 in FIG. 4, the scraper 36 and the large-diameter portion 35 actually cover the upper side of the caliper 28.

Figure 5:
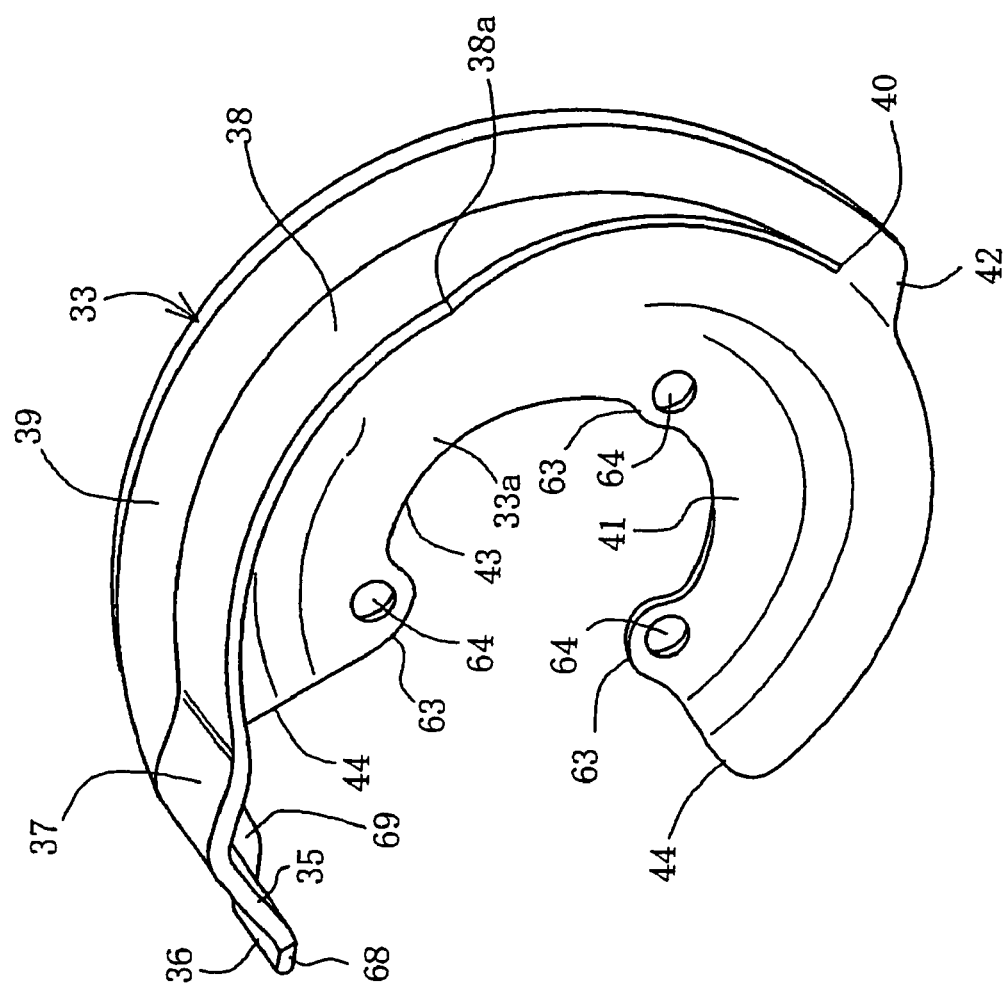
FIG. 5 is a perspective view of a brake disc guard as viewed from the outside thereof.
Figure 8:
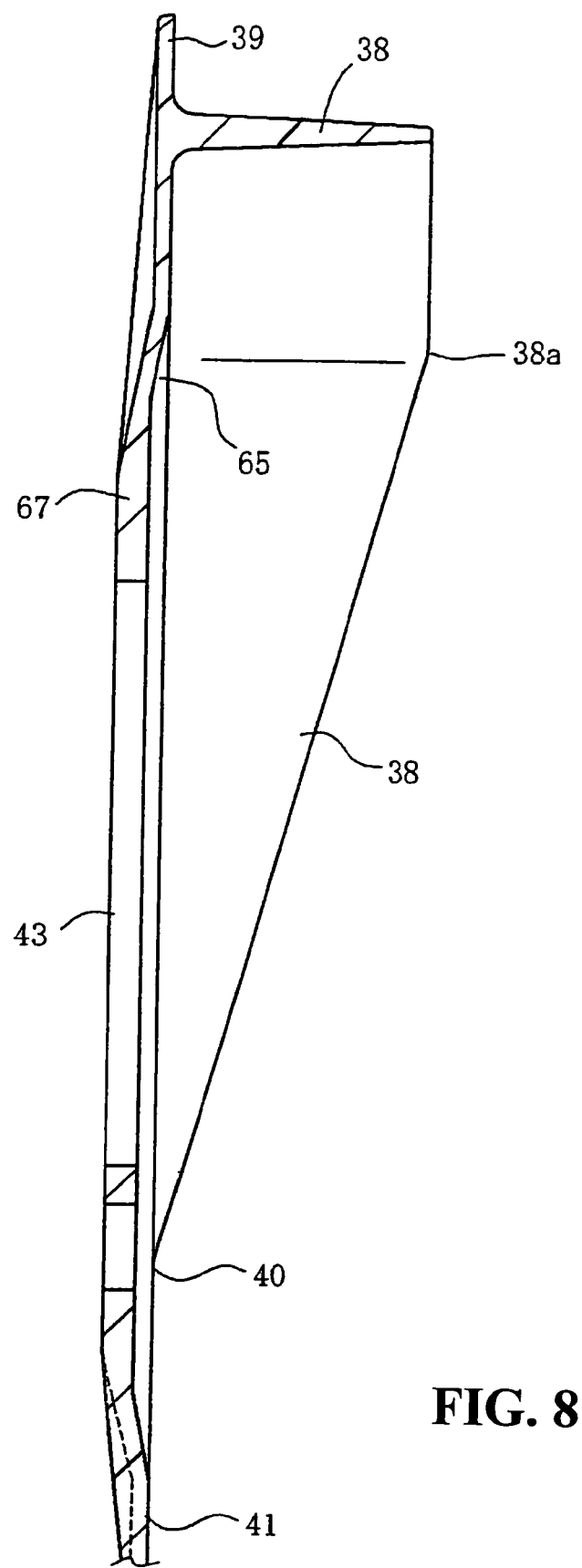
FIG. 8 is a cross section taken along the line 8-8 in FIG. 6.

An upper portion of the flange 38 projects outwardly from the side wall portion 33a through the upper side of the disc 30 to a position slightly axially outside of a connected position between the smallest-diameter portion 32a of the rim 32 and the wheel disc 49. A lower portion of the flange 38 is tapered in the downward direction so that the outside edge of the flange 38 gradually approaches the side wall portion 33a. As illustrated in FIGS. 5 and 8, the flange 38 extends along said cover member 33 and projects a predetermined distance therefrom starting with a lower end 40 that initiates a projection from said cover member 33 to an upper portion that extends a maximum projection from the cover member.

Below the lower end 40 of the flange 38, the relatively large spacing d is defined between the lower portion 41 and the rim 32, and this spacing d functions as an ejection opening for ejecting dirt deposited on the rim 32.

The brake disc guard 33 will now be described in more detail.

FIG. 5 is a perspective view of the brake disc guard 33 as viewed from the outside thereof. The brake disc guard 33 is formed of a suitable material such as resin and metal. The front end of the flange 38 continues through the step portion 37 to the large-diameter portion 35. The outer circumferential portion of the upper portion 39 as a part of the side wall portion 33a is formed so as to project radially outward from the flange 38, so that a guide portion for guiding dirt deposited on the rim 32 is formed by the outside surface of the outer circumferential portion of the upper portion 39 and the outer circumferential surface of the flange 38. Accordingly, the guide portion opens to the outside of the brake disc guard 33 in its mounted condition to thereby facilitate the ejection of the deposited dirt in the sideward direction.

The width of the flange 38 is constant in the range from its front end to a central position 38a and gradually decreases in the range from the central position 38a to the lower end 40. At the lower end 40 in the vicinity of the step portion 42, the flange 38 disappears to become flush with the side wall portion 33a. The inner circumference of the central cutout portion 43 at the center of the side wall portion 33a is formed with a plurality of projections 63 respectively having a plurality of through holes 64 for insertion of the bolts 34 (see FIG. 3).

Figure 6:
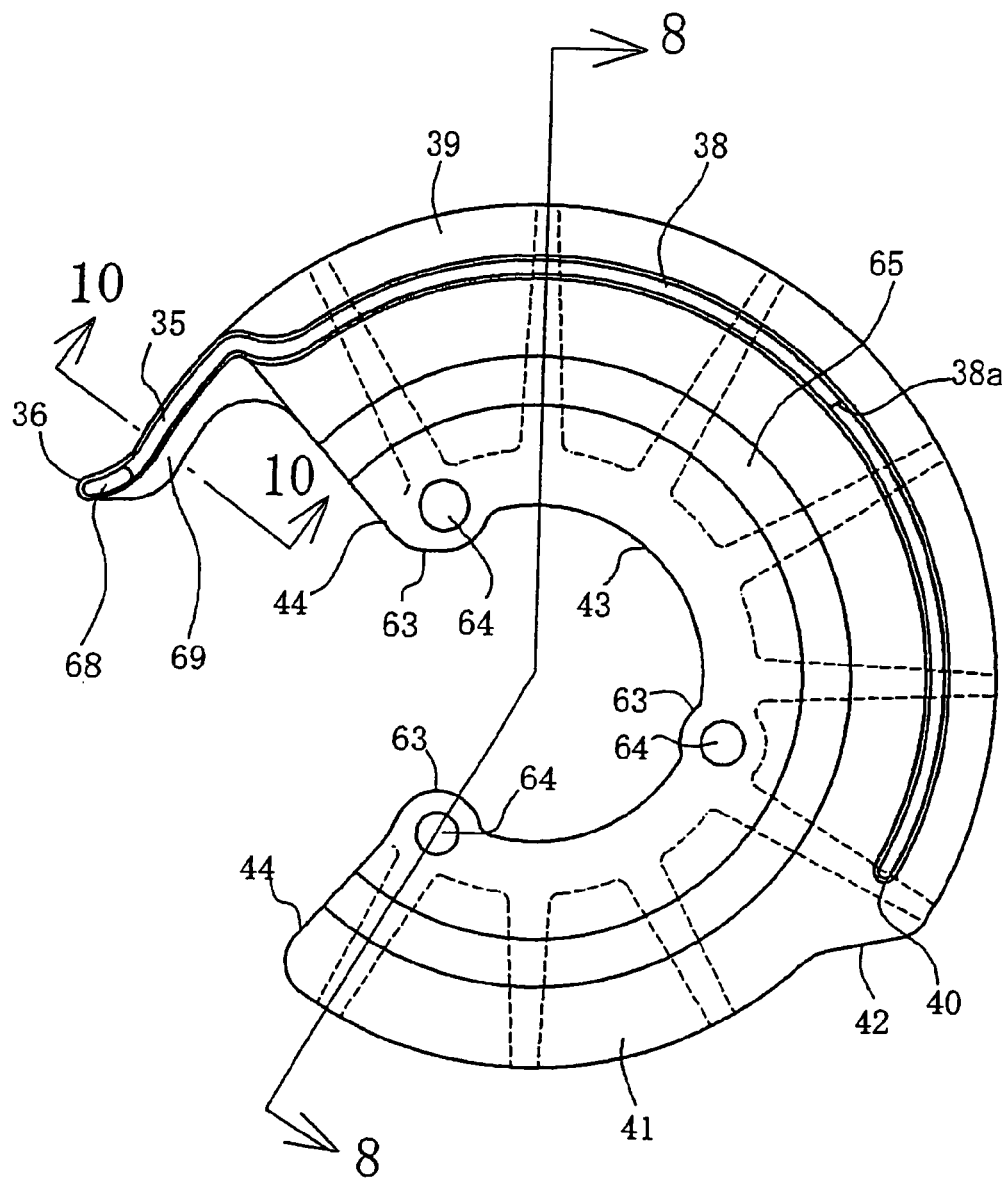
FIG. 6 is a side view of the brake disc guard as viewed from the outside thereof.

FIG. 6 is a side view of the brake disc guard 33 as viewed from the outside thereof. The step portion 37 is formed at a position where the upper edge of the front cutout portion 44 extends to join the front end of the step portion 37. An arcuate step portion 65 concentric with the brake disc guard 33 is formed along a radially intermediate position of the side wall portion 33a. The wall thickness of the side wall portion 33a is changed at the arcuate step portion 65.

Figure 7:
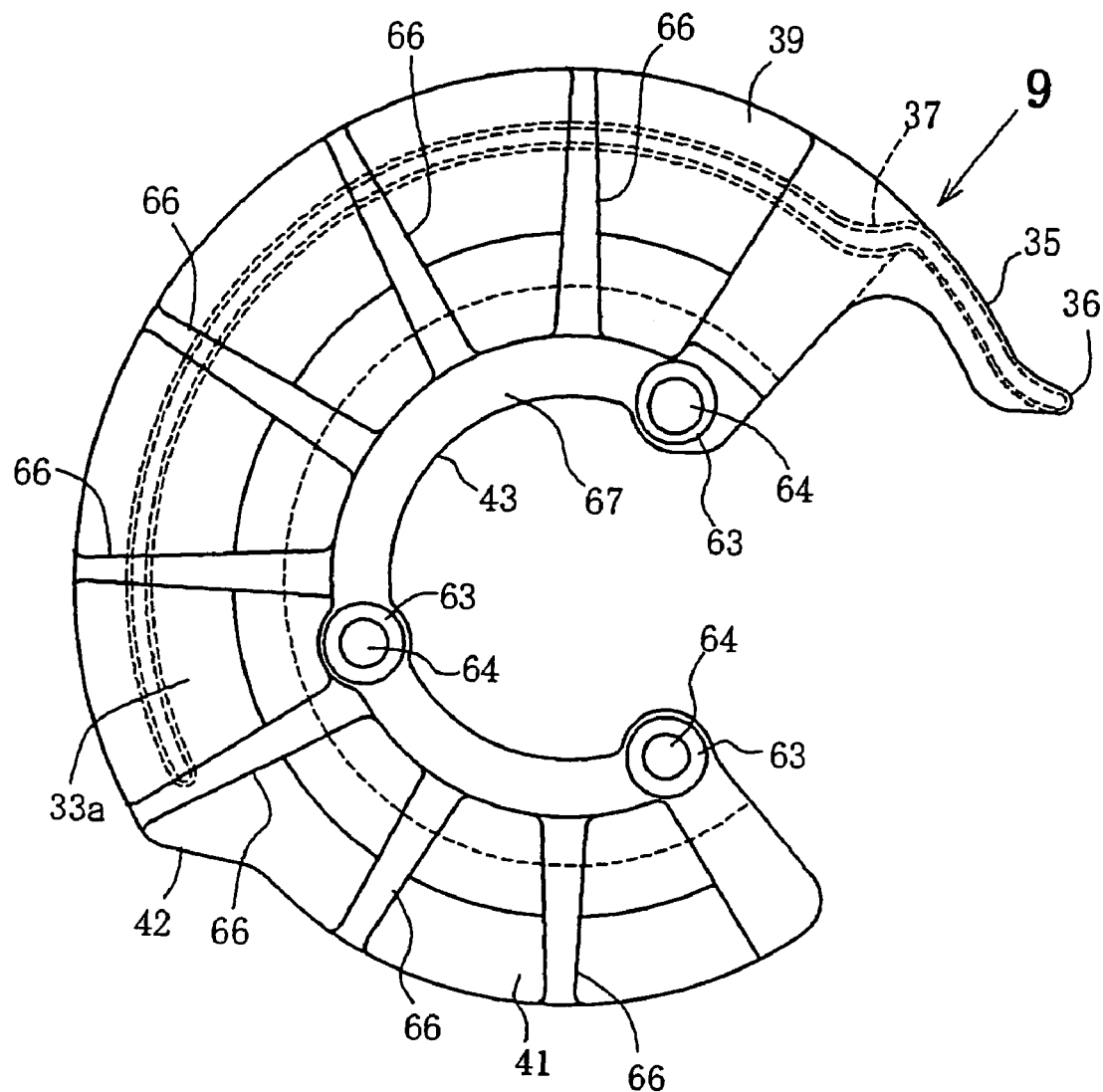
FIG. 7 is a side view of the brake disc guard as viewed from the inside thereof.

FIG. 7 is a side view of the brake disc guard 33 as viewed from the inside thereof. The inside surface of the side wall portion 33a is integrally formed with a plurality of radially extending ribs 66 spaced from each other at regular intervals.

Further, a boss 63 is formed around each through hole 64, and an arcuate thick-walled portion 67 is formed around the central cutout portion 43, so as to increase the rigidity.

FIG. 8 is a cross section taken along the line 8-8 in FIG. 6. The flange 38 projects from the side wall portion 33a at substantially right angles thereto and is tapered toward the outside end. More specifically, the wall thickness of the flange 38 decreases from the base end continuing to the side wall portion 33a to the outside end pointed to the outside of the brake disc guard 33. In addition, the upper surface of the flange 38 is inclined down toward the outside end, so as to facilitate the ejection of the deposited dirt toward the outside end. The large-diameter portion 35 and the scraper 36 also have a similar tapering structure.

The amount of projection of the flange 38 (i.e., the width of the flange 38) is maximum and constant in the range from the front end to the central position 38a formed at about 45° on the rear side from the point P shown in FIG. 3, and gradually decreases from the central position 38a to the lower end 40. As viewed in FIG. 8, the outside edge of this portion of the flange 38 in the range from the central position 38a to the lower end 40 extends obliquely and straight. The outer circumferential portion of the side wall portion 33a, formed radially outside of the arcuate step portion 65, has a wall thickness smaller than that of the flange 38, and the inner circumferential portion of the side wall portion 33a formed radially inside of the arcuate step portion 65 has a wall thickness larger than that of the outer circumferential portion of the side wall portion 33a.

Figure 9:
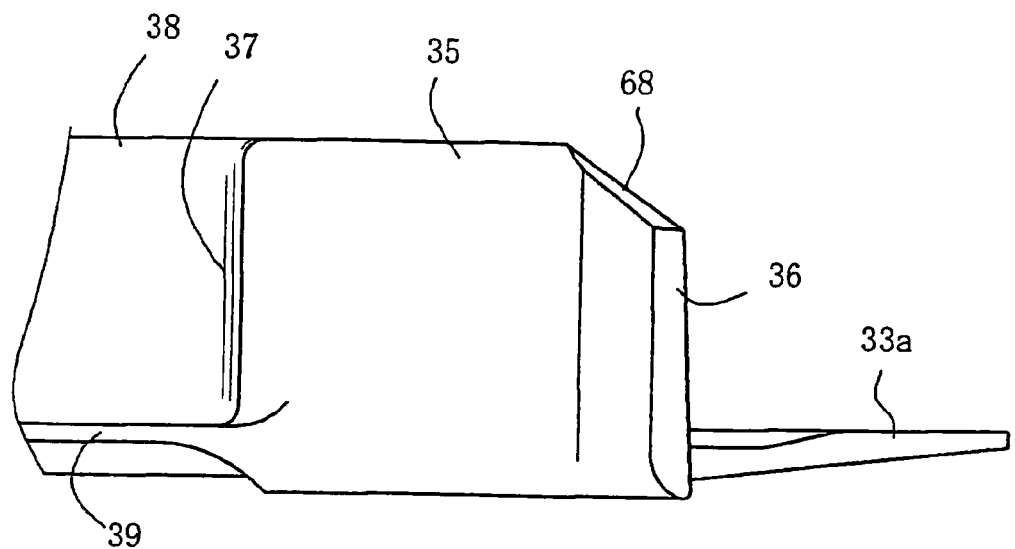
FIG. 9 is a view taken in the direction shown by an arrow 9 in FIG. 7.

FIG. 9 is a view taken in the direction shown by an arrow 9 in FIG. 7, showing the structure of the large-diameter portion 35 and the scraper 36. The scraper 36 formed at the front end of the large-diameter portion 35 is obliquely cut out at its outside end portion to form a cutout portion 68. Accordingly, the width of the scraper 36 gradually decreases from the rear end to the front end.

Figure 10:
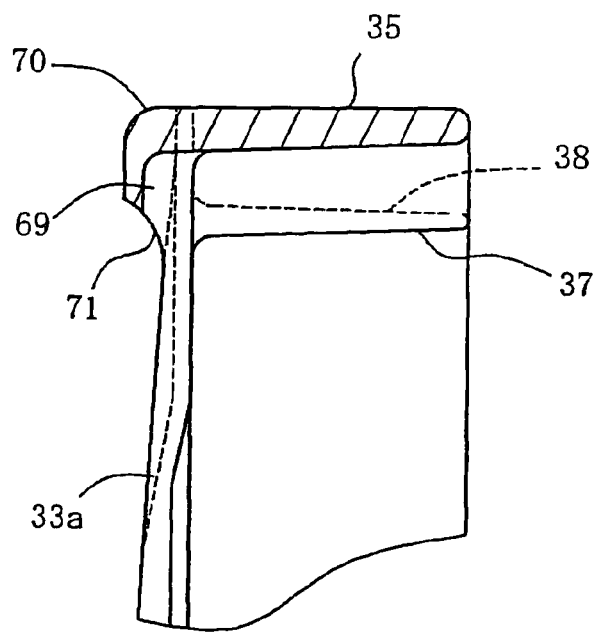
FIG. 10 is a cross section taken along the line 10-10 in FIG. 6.

FIG. 10 is a cross section taken along the line 10-10 in FIG. 6. The large-diameter portion 35 is also tapered so that the wall thickness of the large-diameter portion 35 gradually decreases from the inside end to the outside end. The inside end of the large-diameter portion 35 continues through a round portion 70 to a flange 69 projecting radially inward. Further, the flange 69 continues through a round portion 71 to the side wall portion 33a.

The operation of this preferred embodiment will now be described with reference to FIGS. 11A1 to 11C1 and FIGS. 11A2 to 11C2, which schematically illustrate the dirt ejecting operation of the brake disc guard 33. FIGS. 11A1 to 11C1 are side views of the brake disc guard 33, and FIGS. 11A2 to 11C2 are sectional views of essential parts of the brake disc guard 33, showing the relation between the brake disc guard 33 and dirt 72 such as mud, water, snow, and grass deposited on the rim 32. In the condition shown in FIGS. 11A1 and 11A2, the dirt 72 is deposited on the smallest-diameter portion 32a of the rim at a position below the lower portion 41 of the brake disc guard 33, and the rim 32 starts to be rotated in the direction (forward direction) shown by an arrow F. When the dirt 72 has passed the lower end 40 of the flange 38, the dirt 72 is partially cut away by the width varying portion of the flange 38 in the range from the lower end 40 to the central position 38a, and the remaining part of the dirt 72 enters the space between the outer circumferential surface of the flange 38 and the smallest-diameter portion 32a of the rim 32. Since the spacing c between the flange 38 and the smallest-diameter portion 32a is smaller than the spacing d, a large part of the dirt 72 is separated to fall down. At this time, the amount of the projection of the flange 38 is relatively small, and a relatively large spacing is present on the outside of the brake disc guard 33, so that a large part of the dirt 72 can be smoothly ejected.

In the condition shown in FIGS. 11B1 and 11B2, the dirt 72 sandwiched between the flange 38 and the rim 32 (the smallest-diameter portion 32a) has reached a position before the large-diameter portion 35, and a part of the dirt 72 falls down. Since the amount of projection of the flange 38 in the range from the central position 38a to the step portion 37 is maximum, a part of the dirt 72 separated from the flange 38 does not fall onto the disc 30 (see FIG. 11B2). When the dirt 72 has reached the large-diameter portion 35, the spacing c is suddenly reduced to the spacing b, so that a part of the dirt 72 is further separated down.

In the condition shown in FIGS. 11C1 and 11C2, the remaining part of the dirt 72 is sandwiched between the large-diameter portion 35 and the rim 32 (the smallest-diameter portion 32a). Since the spacing b between the large-diameter portion 35 and the rim 32 is smaller than the spacing c, the amount of the dirt 72 in this smaller space has become minimum. During the further rotation in the direction F, the remaining part of the dirt 72 is scraped off by the scraper 36 formed at the front end of the large-diameter portion 35. Since the scraper 36 is bent radially outwardly to come close to the rim 32 with the spacing a set to be the smallest (see FIG. 11C2), the remaining dirt 72 can be efficiently scraped off. Further, since the output portion 68 is formed along the outside edge of the scraper 36 (see FIG. 9), the dirt 72 scraped off can be smoothly ejected from the cutout portion 68 to the outside of the brake disc guard 33.

The large-diameter portion 35 and the scraper 36 project toward the outside of the brake disc guard 33 so as to cover the upper side of the caliper 28. Accordingly, most of the dirt 72 having reached the position above the caliper 28 can be ejected from the large-diameter portion 35, and the remaining part of the dirt 72 can be reliably scraped off by the scraper 36, thereby preventing the entry of the dirt 72 into the caliper 28. Further, since the large-diameter portion 35 and the scraper 36 project so as to cover the upper side of the caliper bracket 45 and the caliper 28, the dirt 72 separated from the large-diameter portion 35 and the scraper 36 does not fall onto the caliper 28 and the caliper bracket 45 (see FIG. 11C2), thereby reliably preventing the deposition of the dirt 72 to the caliper 28. Accordingly, the brake disc guard 33 is suitable for use in an off-road vehicle to which dirt such as mud, snow, and grass is prone to be deposited.

Further, since the brake disc guard 33 formed of resin has the scraper 36, an increase in size of the caliper bracket 45 can be prevented, unlike a conventional structure, such that a radial projection as a scraper is formed on a metal member as a caliper bracket. Accordingly, a reduction in weight of the brake device can be realized. In addition, since the scraper 36 is formed of resin, a proper clearance can be ensured between the rim 32 and the scraper 36 without the need for high accuracy.

Further, the large-diameter portion 35 and the scraper 36 are formed integrally with the flange 38 so as to extend continuously. That is, the large-diameter portion 35 and the scraper 36 are formed as a part of the flange 38. Accordingly, the entry of dirt into the space between the rim 32 and the flange 38 can be suppressed. Even when dirt enters the space between the rim 32 and the flange 38, the dirt can be positively scraped off by the scraper 36, thereby preventing the entry of dirt into the caliper 28.

The present invention is not limited to the above preferred embodiment, but various modifications and changes may be made within the scope of the present invention. For example, the large-diameter portion 35 may be omitted. Further, the whole of the large-diameter portion 35 may be formed as the step portion 37. Further, the caliper 28 and the caliper bracket 45 may be covered by the large-diameter portion 35 and a part of the flange 38, and the range of covering the caliper 28 and the caliper bracket 45 may be arbitrarily changed.

The present invention is applicable to various vehicles including an off-road motorcycle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A brake device having a disc brake provided inside of a rim of a wheel and supported on a knuckle and a cover member formed of resin for covering a disc of said disc brake, said cover member being provided inside of said rim and supported on said knuckle, wherein said cover member includes a flange projecting axially and outwardly from said cover member towards a wheel disc with a scraper including a free end projecting radially and outwardly from said knuckle, said free end of said scraper projecting radially outwardly and being at a predetermined angle relative to said flange so as to come close to said rim for preventing debris from reaching said disc.

2. The brake device according to claim 1, wherein the flange extends in a circumferential direction along the outer circumference of said disc and projects sideward so as to cover the outer circumference of said disc, said scraper being formed integrally with said flange.

3. The brake device according to claim 2, wherein the cover is a brake disc guard that includes an outer circumference of an upper portion that continues through a step portion to an outer circumference of a lower portion of the brake disc guard, said step portion being formed in a vicinity of a lower end of the flange with the lower portion being smaller in diameter relative to the upper portion.

4. The brake device according to claim 3, wherein a spacing between the scraper and the inside of the rim is smaller relative to the spacing between a large diameter portion and the inside of the rim.

5. The brake device according to claim 4, wherein a spacing between the flange and the inside of the rim is greater relative to the spacing between the large diameter portion and the inside of the rim.

6. The brake device according to claim 5, wherein a spacing between the outer circumference and the inside of the rim is greater relative to the spacing between the flange and the inside of the rim.

7. The brake device according to claim 6, wherein the spacing between the large diameter portion and the inside of the rim is substantially equal to the spacing between the outer circumference of the upper portion and the inside of the rim.

8. The brake device according to claim 2, wherein said scraper and a part of said flange extend so as to cover the upper side of a caliper and a part of a caliper bracket.

9. The brake device according to claim 2, wherein said flange extends along said cover member and projects a predetermined distance therefrom starting with a lower end that initiates a projection from said cover member to an upper portion that extends a maximum projection from the cover member.

10. The brake device according to claim 1, wherein said cover is a brake disc guard and said brake disc guard includes a cutout portion and further including a caliper operatively connected to said knuckle for selectively being brought into engagement with said disc, said caliper being disposed within the cutout portion of said brake disc guard.

11. A brake device comprising:
a disc brake adapted to be provided inside of a rim of a wheel and supported on a knuckle;
a cover member for covering a disc of said disc brake, said cover member being provided inside of said rim and supported on said knuckle; and
a flange projecting axially and outwardly from the cover member towards a wheel disc with a scraper including a free end projecting radially and outwardly from the knuckle, said free end of the scraper projecting radially outwardly and being at a predetermined angle relative to the flange and adapted to be disposed close to said rim for preventing debris from contacting said disc of the disc brake.

12. The brake device according to claim 11, wherein the flange extends in a circumferential direction along the outer circumference of said disc and projects sideward so as to cover the outer circumference of said disc, said scraper being formed integrally with said flange.

13. The brake device according to claim 12, wherein the cover is a brake disc guard that includes an outer circumference of an upper portion that continues through a step portion to an outer circumference of a lower portion of the brake disc guard, said step portion being formed in a vicinity of a lower end of the flange with the lower portion being smaller in diameter relative to the upper portion.

14. The brake device according to claim 13, wherein a spacing between the scraper and the inside of the rim is smaller relative to the spacing between a large diameter portion and the inside of the rim.

15. The brake device according to claim 14, wherein a spacing between the flange and the inside of the rim is greater relative to the spacing between the large diameter portion and the inside of the rim.

16. The brake device according to claim 15, wherein a spacing between the outer circumference and the inside of the rim is greater relative to the spacing between the flange and the inside of the rim.

17. The brake device according to claim 12, wherein said scraper and a part of said flange extend so as to cover the upper side of a caliper and a part of a caliper bracket.

18. The brake device according to claim 12, wherein said flange extends along said cover member and projects a predetermined distance therefrom starting with a lower end that initiates a projection from said cover member to an upper portion that extends a maximum projection from the cover member.

19. The brake device according to claim 11, wherein said cover is a brake disc guard and said brake disc guard includes a cutout portion and further including a caliper operatively connected to said knuckle for selectively being brought into engagement with said disc, said caliper being disposed within the cutout portion of said brake disc guard.

20. A brake device comprising:
a disc brake adapted to be provided inside of a rim of a wheel and supported on a knuckle;
a cover member for covering a disc of said disc brake, said cover member being provided inside of said rim and supported on said knuckle; and
a flange projecting axially and outwardly from the cover member towards a wheel disc with a scraper including a free end projecting radially and outwardly from the knuckle, said free end of said scraper projecting radially outwardly and being at a predetermined angle relative to the flange and adapted to be disposed close to said rim for preventing debris from contacting said disc of said disc brake,
wherein said flange extends in a circumferential direction along the outer circumference of said disc and projects sidewardly along said cover member and projects a predetermined distance therefrom starting with a lower end that initiates a projection from said cover member to an upper portion that extends a maximum projection from the cover member.

* * * * *